(12) United States Patent
Su

(10) Patent No.: US 11,881,984 B2
(45) Date of Patent: Jan. 23, 2024

(54) METHOD FOR HANDLING LARGE-SCALE HOST FAILURES ON CLOUD PLATFORM

(71) Applicant: INSPUR SUZHOU INTELLIGENT TECHNOLOGY CO., LTD., Jiangsu (CN)

(72) Inventor: Zhengwei Su, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/013,501

(22) PCT Filed: Feb. 19, 2021

(86) PCT No.: PCT/CN2021/076909
§ 371 (c)(1),
(2) Date: Dec. 28, 2022

(87) PCT Pub. No.: WO2022/021851
PCT Pub. Date: Feb. 3, 2022

(65) Prior Publication Data
US 2023/0318908 A1 Oct. 5, 2023

(30) Foreign Application Priority Data
Jul. 29, 2020 (CN) .......................... 202010728174.5

(51) Int. Cl.
*H04L 12/24* (2006.01)
*H04L 41/0654* (2022.01)
(Continued)

(52) U.S. Cl.
CPC ...... *H04L 41/0654* (2013.01); *G06F 9/45558* (2013.01); *H04L 41/0609* (2013.01); *G06F 2009/45595* (2013.01)

(58) Field of Classification Search
CPC ... G06F 9/45558; H04L 41/04; H04L 41/044; H04L 41/06; H04L 41/0604;
(Continued)

(56) References Cited

U.S. PATENT DOCUMENTS

2011/0320591 A1* 12/2011 Ozaki ..................... H04L 41/06
709/224
2020/0043524 A1* 2/2020 Roberts ............... G06F 11/1088

FOREIGN PATENT DOCUMENTS

CN 103634167 A 3/2014
CN 104182306 A 12/2014
(Continued)

OTHER PUBLICATIONS

International Search report for PCT/CN2021/076909 dated Apr. 26, 2021.
(Continued)

*Primary Examiner* — Boris D Grijalva Lobos
(74) *Attorney, Agent, or Firm* — Dennemeyer & Associates LLC; Victoria Friedman

(57) ABSTRACT

A method for handling large-scale host failures on a cloud platform includes: configuring a corresponding failed host queue for each host group; setting initial priority values and evacuation count thresholds for cloud hosts; arranging failed hosts in failed host queues according to priorities of the failed hosts, and arranging the cloud hosts in the failed hosts according to priority values of the cloud hosts; handling, by the host group, the failed hosts the cloud hosts and in the corresponding failed host queue according to an arrangement order; when evacuation of a cloud host fails, re-determining a priority value of the cloud host; detecting evacuation capability of the host group corresponding to each failed host queue, and disabling a failed host queue having poor evacuation capability; arranging failed hosts in the disabled failed host queue into remaining failed host
(Continued)

queues; and enabling a failed host queue meeting a condition.

20 Claims, 4 Drawing Sheets

(51) Int. Cl.
*G06F 9/455* (2018.01)
*H04L 41/0604* (2022.01)

(58) Field of Classification Search
CPC ............. H04L 41/0609; H04L 41/0631; H04L 41/065; H04L 41/0654
See application file for complete search history.

(56) References Cited

FOREIGN PATENT DOCUMENTS

| | | | |
|---|---|---|---|
| CN | 105721561 | A | 6/2016 |
| CN | 108632057 | A | 10/2018 |
| CN | 109828867 | A | 5/2019 |
| CN | 110413436 | A | 11/2019 |
| CN | 111970147 | A | 11/2020 |
| EP | 1677468 | A1 | 7/2006 |

OTHER PUBLICATIONS

Search Report for Chinese application 202010728174.5, filed Jul. 29, 2020.

* cited by examiner

US 11,881,984 B2

METHOD FOR HANDLING LARGE-SCALE HOST FAILURES ON CLOUD PLATFORM

CROSS REFERENCE

The present disclosure is a National Stage Filing of the PCT International Application No. PCT/CN2021/076909 filed on Feb. 19, 2021, which claims priority to Chinese Patent Application No. 202010728174.5, filed to the China National Intellectual Property Administration on Jul. 29, 2020 and entitled "Method for Handling Large-Scale Host Failures on Cloud Platform", the disclosure of which is hereby incorporated by reference in its entirety.

TECHNICAL FIELD

The present disclosure relates to the field of methods for handling host failures on a cloud platform, and in particular to a method for handling large-scale host failures on a cloud platform.

BACKGROUND

A cloud platform refers to a service platform that provides computing, network and storage based on hardware resources and software resources. Generally a cloud platform is deployed in a large-scale cluster environment. When a host node fails and cannot continue to provide services, the cloud host running on the host node may be evacuated to other physical hosts through a high availability function, so that a virtual machine can be used normally and the user service is not be affected.

At present, the processes of evacuating cloud hosts by various vendors are basically similar, including monitoring and detecting a failed host node; isolating the failed computing node to prevent the failed node from receiving new data; and evacuating the virtual machine on the failed host node to other host nodes. The cloud host is mechanically evacuated from the failed host node to other healthy host nodes, failing to effectively control the recovery process. This solution can handle a single-node host failure on a cloud computing platform well, but cannot cope with large-scale host failures. For example, host A has cloud hosts a1, a2~am, and host B has cloud hosts b1, b2~bn. When host A fails, it is assumed that all cloud hosts on host A are evacuated to host B. If host B also fails at this time, all cloud hosts on host A may be evacuated in disorder and cannot recover automatically after the node failure on host A is eliminated. When a large-scale host fails, if failure recovery is mechanically performed without restriction, it may lead to a chaotic evacuation of large-scale cloud hosts and the collapse of the entire cloud platform.

In addition, some of the cloud hosts on the host node have high user value, while others may not be so important, depending on different carrying services. When a large-scale failure occurs in a host cluster, there may be insufficient resources due to sharp contraction of computing resources, so it is impossible to guarantee the recovery of all failed hosts and cloud hosts. At this time, ensuring the priority of recovering high-value user services is also one of the realistic demands of high availability of computing.

SUMMARY

Embodiments of the present disclosure provide a method for handling large-scale host failures on a cloud platform, which may solve the problem that when a large-scale host fails, if failure recovery is mechanically performed without restriction, it may lead to a chaotic evacuation of large-scale cloud hosts and the collapse of the entire cloud platform in a related art.

The embodiments of the present disclosure provide a method for handling large-scale host failures on a cloud platform, including the following operations.

At S100, hosts in a cluster are divided into host groups, and a corresponding failed host queue is configured for each host group.

At S200, initial priority values are set for cloud hosts in the hosts, and evacuation count thresholds are set for the cloud hosts.

At S300, failed hosts are detected, the failed hosts are arranged in failed host queues according to priorities of the failed hosts, and the cloud hosts in the failed hosts are arranged according to priority values of the cloud hosts.

At S400, the host group handles the failed host in the corresponding railed host queue according to an arrangement order of the failed host and handles the cloud hosts according to an arrangement order of the cloud hosts; and in a case where evacuation of a cloud host fails, a priority value of the cloud host is re-determined according to a priority value change rule.

At S500, evacuation capability of the host group corresponding to each failed host queue is detected, and a failed host queue having poor evacuation capability is disabled.

At S600, failed hosts in the disabled failed host queue are arranged into remaining failed host queues according to priorities of the failed hosts.

At S700, a failed host queue meeting a condition is enabled.

In some exemplary implementations, the operation of detecting the evacuation capability of the host group corresponding to each failed host queue includes the following operations. The number of cloud hosts that the host group corresponding to the failed host queue fails to evacuate is counted, the number of the cloud hosts that the host group corresponding to the failed host queue fails to evacuate within a period of time is compared with a preset threshold, and the failed host queue is disabled in a case where the number of the cloud hosts exceeds the preset threshold.

In some exemplary implementations, the operation of setting the initial priority values for the cloud hosts in the hosts, and setting the evacuation count thresholds for the cloud hosts includes the following operations.

Metadata of "first setting", "second setting" and "third setting" is added to each cloud host. An attribute value of "second setting" is "yes" or "no", an attribute value of "first setting" includes "first level", "second level" and "third level", and an attribute value of "third setting" is "figure".

In a case where the attribute value of "second setting" is "no", the initial priority value of the cloud host is 0.

In a case where the attribute value of "second setting" is "yes" and the attribute value of "first setting" is "first level", the initial priority value of the cloud host is 1.

In a case where the attribute value of "second setting" is "yes" and the attribute value of "first setting" is "second level", the initial priority value of the cloud host is 2.

In a case where the attribute value of "second setting" is "yes" and the attribute value of "first setting" is "third level", the initial priority value of the cloud host is 3.

In a case where the attribute value of "third setting" is "N", the evacuation count threshold of the cloud host is N.

According to a service content of the cloud host, initial attribute values of "first setting" and "second setting" are set on the cloud host.

In some exemplary implementations, each priority value includes a level value indicating any one of an initial level, a second level, a third level, and up to an Nth level, and an attribute value corresponding to the level value. The priority of the failed host is calculated by weighted average of the attribute values of the priority values of the cloud hosts in the failed host.

In some exemplary implementations, when arranging the cloud hosts according to the priority values of the cloud hosts, the cloud hosts are first sorted according to the level values of the priority values of the cloud hosts, and are sorted according to the attribute values of the priority values in a case where the level values of the priority values are the same.

The host group handles the cloud hosts with high arrangement orders, judges whether the attribute values of the priority values of the cloud hosts are less than or equal to 0, and ignores cloud hosts with the attribute values of the priority values less than or equal to 0.

In some exemplary implementations, the failed hosts are preferentially arranged in the failed host queue enabling the failed hosts to be arranged in high arrangement orders according to the priorities of the failed hosts, and the failed hosts in the same failed host queue are sorted according to the priorities of the failed hosts.

The host group handles the failed host in the first order in the failed host queue, judges whether an attribute value of the priority of the failed host is less than or equal to 0, and removes the failed host with the attribute value of the priority less than or equal to 0 from the failed host queue.

In some exemplary implementations, in a case where it is judged that an evacuation count of the failed host removed from the failed host queue is less than an evacuation failure count threshold, the priority value of the cloud host in the failed host is restored to the initial priority value, and the failed host is rearranged in another failed host queue.

In some exemplary implementations, the operation of re-determining the priority value of the cloud host according to the priority value change rule in the case where the evacuation of the cloud host fails, includes the following operations.

At S401, an evacuation failure count of the cloud host is compared with the evacuation count threshold of the cloud host, S402 is executed in a case where the evacuation failure count is less than the evacuation count threshold, and S403 is executed in a case where the evacuation failure count is equal to the evacuation count threshold.

At S402, a reduction value is acquired, the reduction value is subtracted from an attribute value of the priority value of the cloud host to determine an attribute value of a target priority value of the cloud host, and a level value of the target priority value of the cloud host is determined according to a level value of the priority value of the cloud host plus one.

At 403, the priority value of the cloud host is restored to the initial priority value, and the attribute value of the priority value is set to 0.

In some exemplary implementations, a ratio of the number of cloud hosts that the host group corresponding to the failed host queue fails to evacuate to the evacuation count threshold is acquired, and the reduction value of the priority value of the cloud hosts is determined according to a mapping table between the ratio and the reduction value.

In some exemplary implementations, the operation of enabling the failed host queue meeting the condition includes the following operations.

At S701, the failed host queue is enabled after the failed host in the host group corresponding to the disabled failed host queue is repaired.

At S702, the cloud host evacuated by the host in the host group corresponding to the disabled failed host queue migrates, and the failed host queue is enabled.

The method for handling large-scale host failures on a cloud platform provided by the embodiments of the present disclosure has the following beneficial effects.

The method for handling large-scale host failures on a cloud platform provided by the embodiments of the present disclosure determines the initial priority value of a cloud host by setting the attribute values of "second setting" and "first setting" according to a service content of the cloud host when creating the cloud host. For the host configured with cloud hosts, the initial priority of the host is determined by calculating the weighted average of the initial priority values of the configured cloud hosts. The hosts in a cluster are divided into host groups, each host group is provided with a failed host queue correspondingly, and each host group evacuates the failed hosts in the corresponding failed host queue. According to the initial priorities, hosts are arranged in the failed host queue. The cluster gives priority to the failed hosts with high initial priority, and the cloud hosts with high initial priorities in the failed hosts are preferentially handled. It is targeted to ensure the priority recovery of high-value user services under fixed computing resources. Furthermore, the number of cloud hosts that the host group corresponding to the failed host queue fails to evacuate is counted (for example, if the evacuation of the same cloud host fails twice, the count is 2), and is compared with a threshold, so that the evacuation capability of the host corresponding to the failed host queue is evaluated. In a case where the number of the cloud hosts exceeds the preset threshold, it represents that the host group corresponding to the failed host queue loses its evacuation capability, and the failed host queue is disabled, so as to prevent the host without the evacuation capability from participating in the evacuation process, thereby avoiding the occurrence of evacuation disorder. In a case where the priority value of any level of cloud hosts in the same failed host queue is less than or equal to 0, the host group ignores the cloud host, thus limiting the number of times the same failed host queue handles the same host cloud. The failed host queue may be disabled after capability evaluation, so that the cloud host that cannot be evacuated by the host group corresponding to the failed host queue can be removed from the failed host queue. The priority value of the cloud host that is removed from the original failed host queue is restored to the initial priority value, and the initial priority of the failed host is re-determined according to the initial priority value. The removed failed host can be evacuated through other host groups within a range allowed by the evacuation count threshold, thus avoiding the evacuation failure of the cloud host caused by the mismatch between the cloud host and the host group, limiting the evacuation count threshold of the cloud host, and avoiding the occupation of resources by cloud hosts that cannot be evacuated.

BRIEF DESCRIPTION OF THE DRAWINGS

In order to more clearly explain the technical solutions in the embodiments of the present disclosure or in a related art, the drawings required in the descriptions of the embodiments or the related art will be briefly introduced below. It is apparent that the drawings in the following descriptions are only some embodiments of the present disclosure. Those having ordinary skill in the art may also obtain other drawings in accordance with structures shown in these drawings without creative efforts.

The realization of the purpose, functional characteristics and advantages of the present disclosure will be further explained with reference to the attached drawings in combination with the embodiments.

DETAILED DESCRIPTION

It is to be understood that the exemplary embodiments described herein are only used to explain the present disclosure, and are not used to limit the present disclosure.

Figure 1:
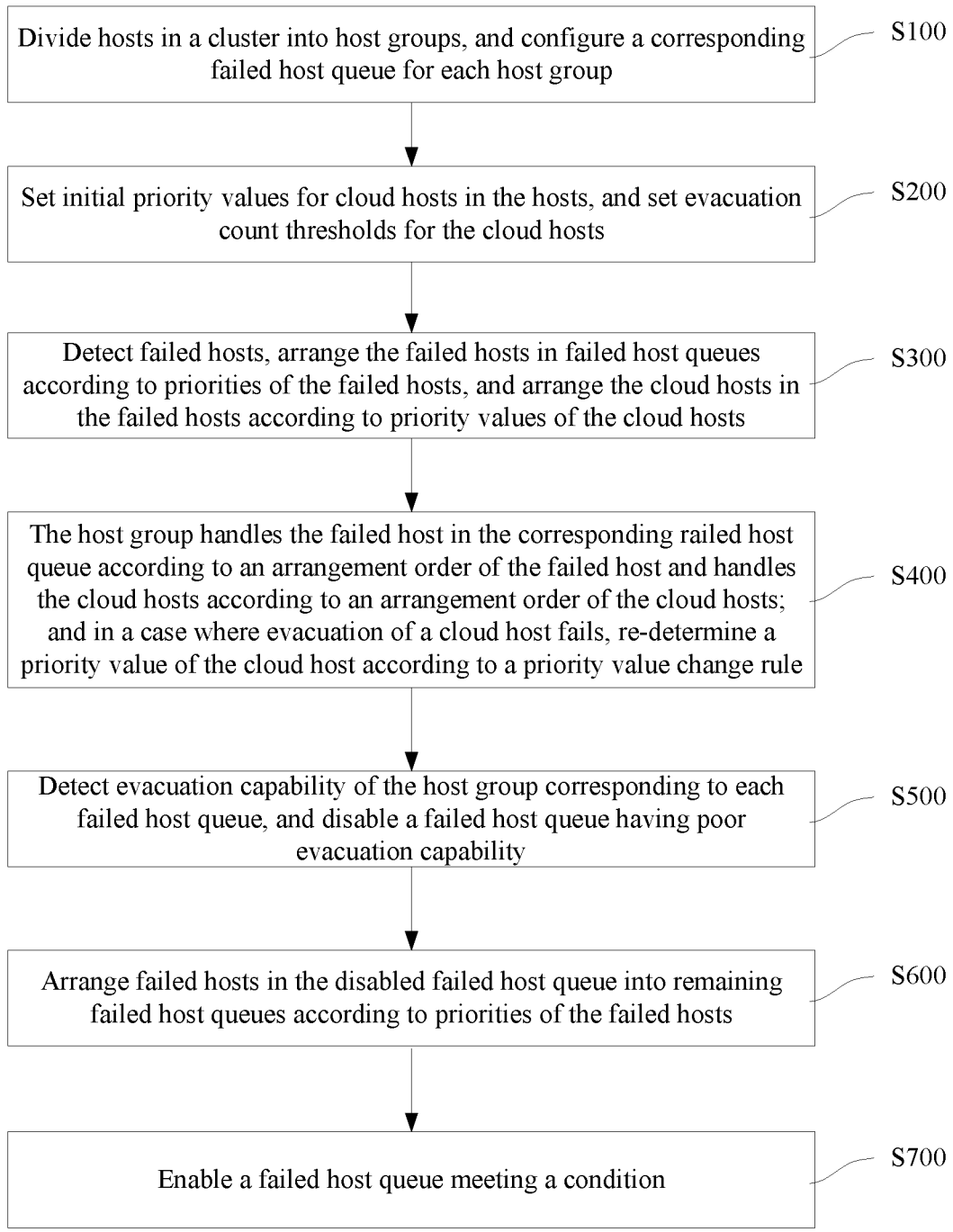
FIG. 1 is a flowchart of a method for handling large-scale host failures on a cloud platform according to the embodiments of the present disclosure.
Figure 2:
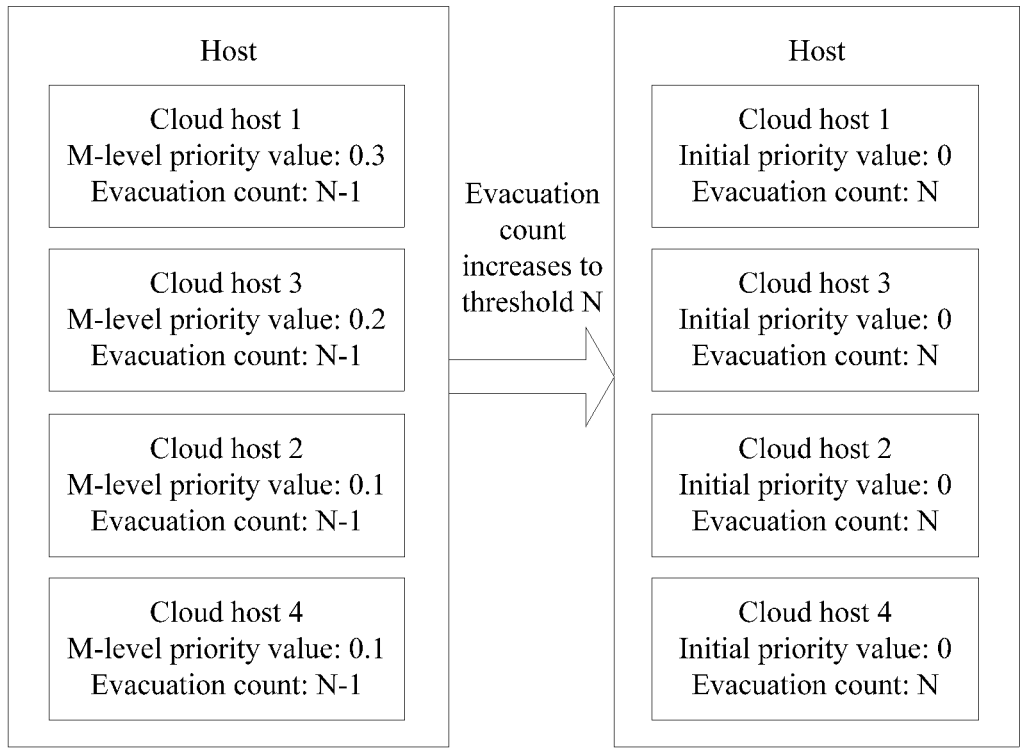
FIG. 2 is a schematic diagram of a change of a priority value of a cloud host when evacuation count reaches a threshold according to the embodiments of the present disclosure.

Referring to FIG. 1, the embodiments of the present disclosure provide a method for handling large-scale host failures on a cloud platform, including the following operations.

At S100, hosts in a cluster are divided into host groups, and a corresponding failed host queue is configured for each host group. In a case where there are multiple hosts in a host group, a common port set is established based on ports, configured to evacuate cloud hosts, of the hosts in the same host group, and the port set is connected to the failed host queue corresponding to the host group. In a case where there is only one host in a host group, the port, configured to evacuate the cloud host, of the host is connected to the failed host queue. If a host is diagnosed as a failed host, the port of the host in the port set is disabled.

At S200, initial priority values are set for cloud hosts in the hosts, and evacuation count thresholds are set for the cloud hosts.

In some exemplary implementations, metadata of "first setting" and "second setting" are added to each cloud host. An attribute value of "second setting" is "yes" or "no", and an attribute value of "first setting" includes "first level", "second level" and "third level". When a cloud host is configured on the host, an administrator configures the attribute values of "second setting" and "first setting" through interactive option prompts. The attribute value of "second setting" is selected as "yes" by default, and the attribute value of "first setting" is selected as "first level" by default.

In a case where the attribute value of "second setting" is "no", the initial priority value of the cloud host is 0. The case that the attribute value of "second setting" is "no" is mainly for the case that the cloud host on the cloud platform is not able to be evacuated when the host fails, such as the cloud hosts with acceleration devices. In any failed host queue, the corresponding host group ignores the cloud host with the initial priority value of 0. Therefore, the cloud host with the attribute value of "second setting" of "no" does not occupy resources. In a case where the failed host contains the cloud host with the attribute value of "second setting" of "no", after evacuation, the initial priority of the failed host, in which only the cloud host with the initial priority value of 0 is left, is 0, and the host group also ignores the failed host with the initial priority of 0.

In a case where the attribute value of "second setting" is "yes" and the attribute value of "first setting" is "first level", the initial priority value of the cloud host is 1. In a case where the attribute value of "second setting" is "yes" and the attribute value of "first setting" is "second level", the initial priority value of the cloud host is 2. In a case where the attribute value of "second setting" is "yes" and the attribute value of "first setting" is "third level", the initial priority value of the cloud host is 3. During configuration, the administrator performs configuration according to the value degree of service that the cloud host needs to carry, and the priority value of the cloud host increases with the increase of the value degree of the service that the cloud host needs to carry. If the service carried by the cloud host is changed during use, the administrator modifies the attribute values of "second setting" and "first setting" to reconfigure the initial priority value of the cloud host. The higher the service value is, the higher the initial priority value is.

The evacuation count threshold of the cloud host is set. Metadata of "third setting" is added to each cloud host, and an attribute value of "third setting" is "figure". The attribute value of "third setting" is "N", and the evacuation count threshold of the cloud host is N. Here, N represents a figure. When the number of evacuation attempts of a cloud host is greater than N, the hosts in the cluster ignore the cloud host. In an exemplary implementation process, when the number of evacuation attempts of a cloud host is equal to N, the initial priority value of the cloud host is set to 0.

Each priority value includes a level value indicating any one of an initial level, a second level, a third level, and up to an Nth level, and an attribute value corresponding to the level value. The priority value changes in case of evacuation failure of the cloud host, and the operation of re-determining the priority value of the cloud host according to the priority value change rule specifically includes the following operations.

At S401, an evacuation failure count of the cloud host is compared with the evacuation count threshold of the cloud host, S402 is executed in a case where the evacuation failure count is less than the evacuation count threshold, and S403 is executed in a case where the evacuation failure count is equal to the evacuation count threshold.

At S402, a reduction value is acquired, the reduction value is subtracted from an attribute value of the priority value of the cloud host to determine an attribute value of a target priority value of the cloud host, and a level value of the target priority value of the cloud host is determined according to a level value of the priority value of the cloud host plus one.

At S403, the priority value of the cloud host is restored to the initial priority value, and the attribute value of the priority value is set to 0.

Figure 3:
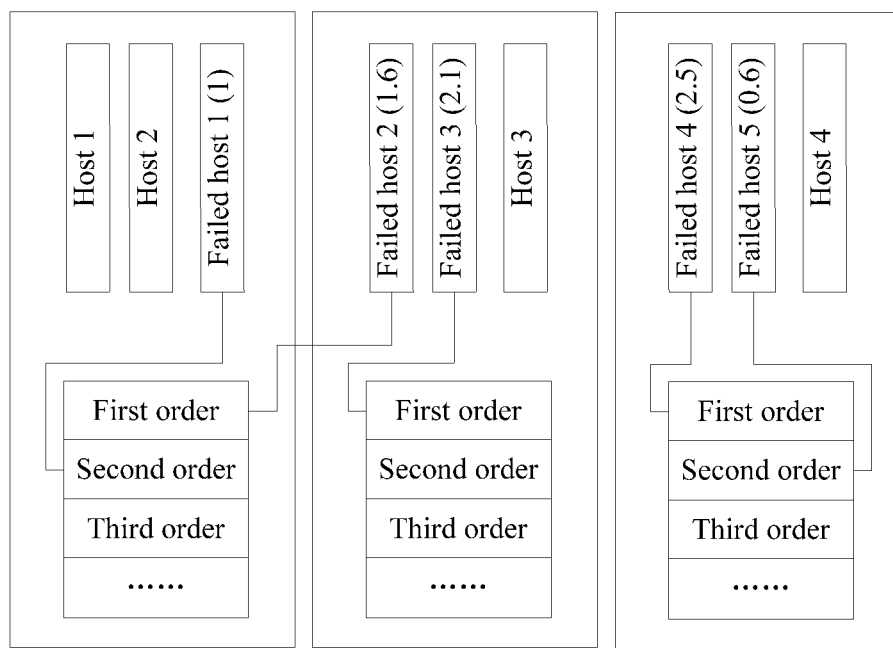
FIG. 3 is a schematic diagram of host grouping, failed host queue and failed host arrangement according to the embodiments of the present disclosure.
Figure 4:
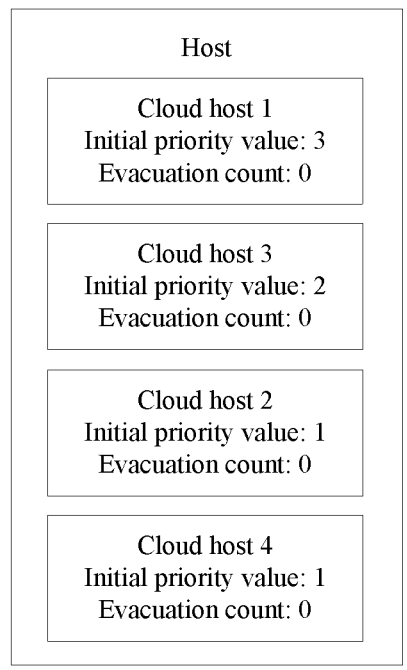
FIG. 4 is a schematic diagram of cloud hosts arranged according to initial priority values among hosts according to the embodiments of the present disclosure.
Figure 5:
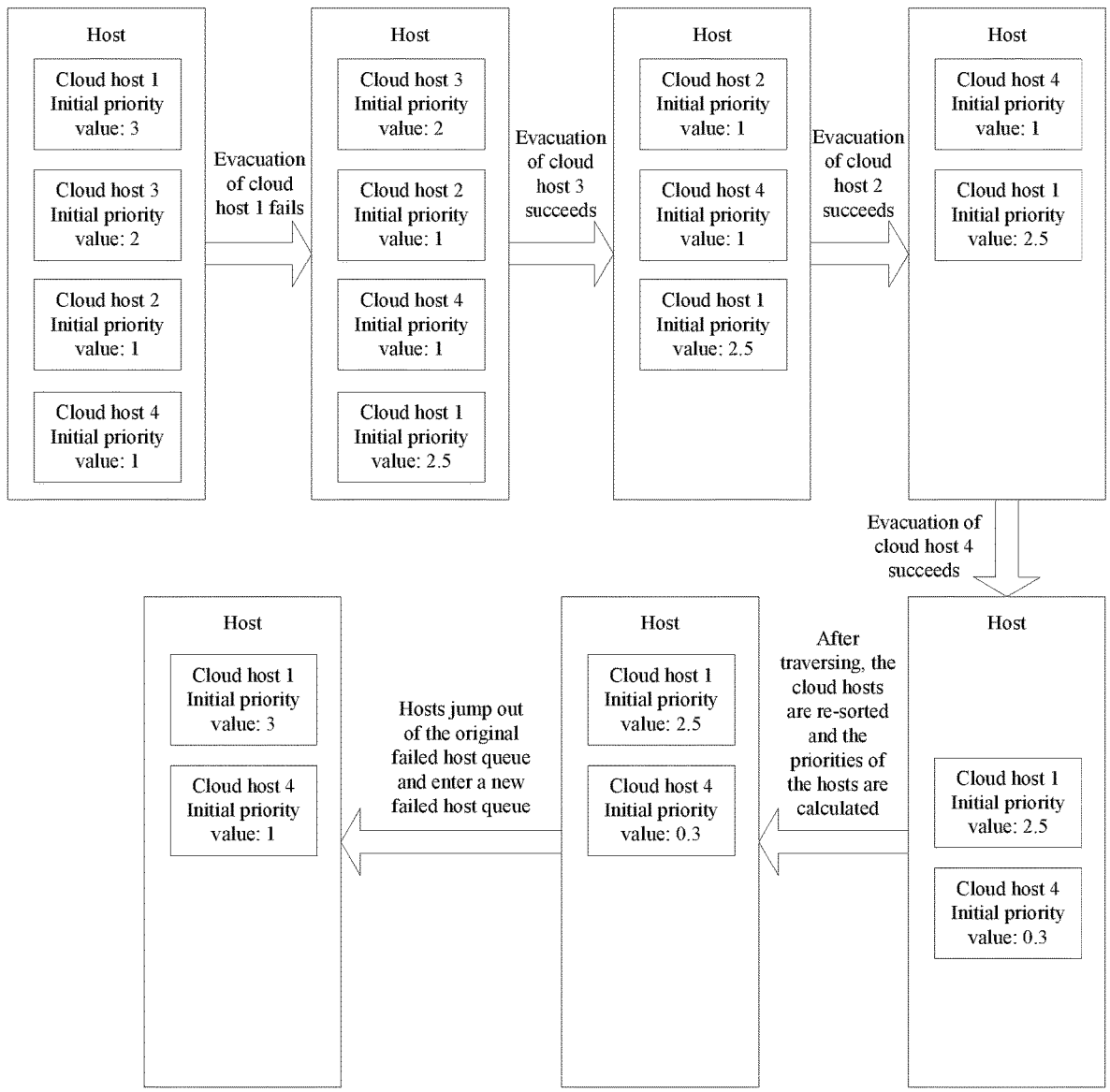
FIG. 5 is a schematic diagram of changes of hosts and cloud hosts of the hosts through various processes according to the embodiments of the present disclosure.

At S300, failed hosts are detected, the failed hosts are arranged in failed host queues according to priorities of the failed hosts, and the cloud hosts in the failed hosts are arranged according to priority values of the cloud hosts. Herein, the priority of the failed host is calculated by weighted average of the attribute values of the priority values of the cloud hosts in the failed host. For example, in a case where a cloud hosts with the attribute values of the priority values of 3, b cloud hosts with the attribute values of the priority values of 2, c cloud hosts with the attribute values of the priority values of 1, and d cloud hosts with the attribute values of the priority values of 0 are carried on a certain host, the priority of the host is (a*3+b*2+c*1)/(a+b+c+d). In an exemplary implementation process, a detection apparatus sends a detection instruction to a host in a cycle, and if the detection apparatus does not receive response information from the host within a preset time, it is judged that the tested host fails. The detection instruction may be a ping instruction or other related detection methods. In an exemplary implementation process, the failed hosts are preferentially arranged in the failed host queue enabling the failed hosts to be arranged in high arrangement orders according to the priorities of the failed hosts, and the failed hosts in the same failed host queue are sorted according to the priorities of the failed hosts. As shown in FIG. 3, the hosts in the cluster are divided into host groups, and each group is correspondingly provided with a failed host queue. There is one failed host in the three hosts of the first group, which is failed host 1 with the initial priority (1). There are two failed hosts in the three hosts of the second group, which are failed host 2 with the initial priority (1.6) and failed host 3 with the initial priority (2.1). There are two failed hosts in the three hosts of the third group, which are failed host 4 with the initial priority (2.5) and failed host 5 with initial priority (0.6). Thus, the failed hosts first fill the first order of all the failed host queues, and then fill the second order of all the failed host queues, and so on . . . . If the first order is vacant, the first order is supplemented by the failed host with the highest priority in the second order. As shown in FIG. 3, failed host 2, failed host 3 and failed host 4 are distributed in the first order of the failed host queues, and failed host 1 and failed host 5 are distributed in the second order of the failed host queues. If host 3 evacuates all the cloud hosts in failed host 3, the first order of the second failed host queue is vacated and supplemented by the failed host 1. Referring to FIGS. 4 and 5, the arrangement order of the cloud hosts in the hosts are determined according to the level and attribute value of the priority value. The cloud hosts are first sorted according to level values of the priority values, and are sorted according to the attribute values of the priority values if the level values of the priority values are the same.

At S400, the host group handles the failed hosts in the corresponding failed host queue according to an arrangement order of the failed host, and handles the cloud hosts according to an arrangement order of the cloud hosts. In some exemplary implementations, the host group handles and evacuates the failed host in the first order in the failed host queue, judges whether the priority of the failed host is less than or equal to 0, and removes the failed host with the priority less than or equal to 0 from the failed host queue.

The host group handles the cloud hosts with high arrangement orders, judges whether the attribute values of the priority values of the cloud hosts are less than or equal to 0, and ignores cloud hosts with the attribute values of the priority values less than or equal to 0. As shown in FIG. 5, when the host group evacuates failed hosts, the cloud hosts in the failed hosts are traversed and evacuated, and the priority value of the cloud host that fails to be evacuated once increases and the attribute of the priority value decreases. The priority of the host is recalculated according to the attribute values of the priority values of the remaining non-evacuated cloud hosts, and the hosts are re-sorted.

In an exemplary implementation process, a ratio of the number of cloud hosts that the host group corresponding to the failed host queue fails to evacuate to the evacuation count threshold is acquired, and a reduction value of the priority value of the cloud hosts is determined according to a mapping table between the ratio and the reduction value.

The number of cloud hosts that the host group corresponding to the failed host queue fails to evacuate is counted in real time, an evacuation failure threshold of the cloud hosts in a predetermined period is set, a time period same as the predetermined period is obtained, the number of cloud hosts with failed evacuation is counted, and a ratio of the number of cloud hosts with failed evacuation to the evacuation count threshold is acquired. The larger the ratio is, the weaker the evacuation capability of the host group is, and it is necessary to traverse all the failed hosts in the failed host queue as soon as possible to evacuate the cloud host group that can be evacuated. This requires the reduction of the attribute value of the priority value to be greater, so as to ensure that the reduction value of the priority value of the handled failed host is large enough and that the failed host is not arranged in front of the unhandled failed hosts. A mapping table between the ratio and the reduction value that meets this requirement is set, the corresponding reduction value is obtained according to the ratio, and the attribute value of the priority value of the cloud host with failed evacuation is determined.

It is judged that the evacuation count of the failed host removed from the failed host queue is less than the evacuation failure count threshold. If so, the priority value of the cloud host in the failed host is restored to the initial priority value, and the failed host is rearranged in another failed host queue.

At S500, the evacuation capability of the host group corresponding to each failed host queue is detected, and a failed host queue having poor evacuation capability is disabled. The operation of detecting the evacuation capability of the host group corresponding to each failed host queue includes that the number of cloud hosts that the host group corresponding to the failed host queue fails to evacuate is counted, the number of the cloud hosts that the host group corresponding to the failed host queue fails to evacuate within a period of time is compared with a preset threshold, and the failed host queue is disabled in a case where the number of the cloud hosts exceeds the preset threshold. The number of cloud hosts that the host group corresponding to the failed host queue fails to evacuate is counted in real time, the evacuation failure threshold of cloud hosts in a predetermined period is set, a time period same as the predetermined period is obtained, and the number of cloud hosts with failed evacuation is counted.

At S600, failed hosts in the disabled failed host queue are arranged into remaining failed host queues according to priorities of the failed hosts.

The failed host in the to-be-disabled failed host queue is removed. The priority value of the cloud host in the failed host is restored to the initial priority value. The priority of the failed host is calculated according to the weighted average of the initial priority value. The failed hosts are arranged into another failed host queue according to an arrangement rule of the failed hosts.

At S700, a failed host queue meeting a condition is enabled. The operation of enabling the failed host queue meeting the condition includes the following operations.

At S701, the failed host queue is enabled after the failed host in the host group corresponding to the disabled failed host queue is repaired.

At S702, the cloud host evacuated by the host in the host group corresponding to the disabled failed host queue migrates, and the failed host queue is enabled.

The method for handling large-scale host failures on a cloud platform provided by the embodiments of the present disclosure determines the initial priority value of a cloud host by setting the attribute values of "second setting" and "first setting" according to a service content of the cloud host when creating the cloud host. For the host configured with cloud hosts, the initial priority of the host is determined by calculating the weighted average of the initial priority values of the configured cloud hosts. The hosts in a cluster are divided into host groups, each host group is provided with a failed host queue correspondingly, and each host group evacuates the failed hosts in the corresponding failed host queue. According to the initial priorities, hosts are arranged in the failed host queue. The cluster gives priority to the failed hosts with high initial priority, and the cloud hosts with high initial priorities in the failed hosts are preferentially handled. It is targeted to ensure the priority recovery of high-value user services under fixed computing resources. Furthermore, the number of cloud hosts that the host group corresponding to the failed host queue fails to evacuate is counted (for example, if the evacuation of the same cloud host fails twice, the count is 2), and is compared with a certain threshold, so that the evacuation capability of the host corresponding to the failed host queue is evaluated. In a case where the number of the cloud hosts exceeds the preset threshold, it represents that the host group corresponding to the failed host queue loses its evacuation capability, and the failed host queue is disabled, so as to prevent the host without the evacuation capability from participating in the evacuation process, thereby avoiding the occurrence of evacuation disorder. In a case where the priority value of any level of cloud hosts in the same failed host queue is less than or equal to 0, the host group ignores the cloud host, thus limiting the number of times the same failed host queue handles the same host cloud. The failed host queue may be disabled after capability evaluation, so that the cloud host that cannot be evacuated by the host group corresponding to the failed host queue can be removed from the failed host queue. The priority value of the cloud host that is removed from the original failed host queue is restored to the initial priority value, and the initial priority of the failed host is re-determined according to the initial priority value. The removed failed host can be evacuated through other host groups within a range allowed by the evacuation count threshold, thus avoiding the evacuation failure of the cloud host caused by the mismatch, limiting the evacuation count threshold of the cloud host, and avoiding the occupation of resources by cloud hosts that cannot be evacuated.

The above are the exemplary embodiments of the present disclosure, but it should be noted that various changes and modifications can be made without departing from the scope of the embodiments disclosed in the present disclosure defined by the claims. The functions, operations and/or actions of the method claims according to the disclosed embodiments described herein need not be executed in any particular order. In addition, although the elements disclosed in the embodiments of the present disclosure can be described or claimed in individual form, they can also be understood as multiple unless explicitly limited to singular.

It should be understood that, as used herein, the singular form "a" and "one" is intended to also include the plural form unless the context clearly supports exceptions. It should also be understood that "and/or" as used herein means any and all possible combinations including one or more items listed in association.

The embodiment numbers disclosed in the above embodiments of the present disclosure are adopted not to represent superiority-inferiority of the embodiments but only for description.

Those having ordinary skill in the art can understand that all or part of the operations to realize the above embodiments can be completed by hardware, or related hardware can be instructed to complete by programs, the programs can be stored in a computer-readable storage medium, and the storage medium may be a read-only memory, a magnetic disk or an optical disk, etc.

Those having ordinary skill in the art should understand that the discussion of any of the above embodiments is only exemplary, and is not intended to imply that the scope (defined by the claims) disclosed by the embodiments of the present disclosure is limited to these examples. Under the idea of the embodiments of the present disclosure, technical features in the above embodiments or different embodiments may also be combined, and there are many other variations of different aspects of the above embodiments of the present disclosure, which are not provided in details for brevity. Therefore, any omission, modification, equivalent substitution, improvement, etc. made within the spirit and principle of the embodiments of the present disclosure should be included in the scope of protection of the embodiments of the present disclosure.

What is claimed is:

1. A method for handling large-scale host failures on a cloud platform, comprising:
    S100, dividing hosts in a cluster into host groups, and configuring a corresponding failed host queue for each host group;
    S200, setting initial priority values for cloud hosts in the hosts, and setting evacuation count thresholds for the cloud hosts;
    S300, detecting failed hosts, arranging the failed hosts in failed host queues according to priorities of the failed hosts, and arranging the cloud hosts in the failed hosts according to priority values of the cloud hosts;
    S400, handling, by the host group, the failed hosts in the corresponding failed host queue according to an arrangement order of the failed host, and handling, by the host group, the cloud hosts according to an arrangement order of the cloud hosts; in a case where evacuation of a cloud host fails, re-determining a priority value of the cloud host according to a priority value change rule;
    S500, detecting evacuation capability of the host group corresponding to each failed host queue, and disabling a failed host queue having poor evacuation capability;
    S600, arranging failed hosts in the disabled failed host queue into remaining failed host queues according to priorities of the failed hosts; and
    S700, enabling a failed host queue meeting a condition.

2. The method for handling large-scale host failures on a cloud platform according to claim 1, wherein detecting the evacuation capability of the host group corresponding to each failed host queue comprises: counting the number of cloud hosts that the host group corresponding to the failed host queue fails to evacuate, comparing the number of the cloud hosts that the host group corresponding to the failed host queue fails to evacuate within a period of time with a preset threshold, and disabling the failed host queue in a case where the number of the cloud hosts exceeds the preset threshold.

3. The method for handling large-scale host failures on a cloud platform according to claim 1, wherein setting the initial priority values for the cloud hosts in the hosts, and setting the evacuation count thresholds for the cloud hosts comprises:
  adding metadata of "first setting", "second setting" and "third setting" to each cloud host, an attribute value of "second setting" being "yes" or "no", an attribute value of "first setting" comprising "first level", "second level" and "third level", and an attribute value of "third setting" being "figure", wherein
  in a case where the attribute value of "second setting" is "no", the initial priority value of the cloud host is 0,
  in a case where the attribute value of "second setting" is "yes" and the attribute value of "first setting" is "first level", the initial priority value of the cloud host is 1,
  in a case where the attribute value of "second setting" is "yes" and the attribute value of "first setting" is "second level", the initial priority value of the cloud host is 2,
  in a case where the attribute value of "second setting" is "yes" and the attribute value of "first setting" is "third level", the initial priority value of the cloud host is 3,
  in a case where the attribute value of "third setting" is "N", the evacuation count threshold of the cloud host is N, and
  initial attribute values of "first setting" and "second setting" are set on the cloud host according to a service content of the cloud host.

4. The method for handling large-scale host failures on a cloud platform according to claim 1, wherein each priority value comprises a level value indicating any one of an initial level, a second level, a third level, and up to an Nth level, and an attribute value corresponding to the level value, wherein the priority of the failed host is calculated by weighted average of the attribute values of the priority values of the cloud hosts in the failed host.

5. The method for handling large-scale host failures on a cloud platform according to claim 4, wherein when arranging the cloud hosts according to the priority values of the cloud hosts, the cloud hosts are first sorted according to the level values of the priority values of the cloud hosts, and are sorted according to the attribute values of the priority values in a case where the level values of the priority values are the same;
  the host group handles the cloud hosts with high arrangement orders, judges whether the attribute values of the priority values of the cloud hosts are less than or equal to 0, and ignores cloud hosts with the attribute values of the priority values less than or equal to 0.

6. The method for handling large-scale host failures on a cloud platform according to claim 1, wherein the failed hosts are preferentially arranged in the failed host queue enabling the failed hosts to be arranged in high arrangement orders according to the priorities of the failed hosts, and the failed hosts in the same failed host queue are sorted according to the priorities of the failed hosts;
  the host group handles the failed host in the first order in the failed host queue, judges whether an attribute value of the priority of the failed host is less than or equal to 0, and removes the failed host with the attribute value of the priority less than or equal to 0 from the failed host queue.

7. The method for handling large-scale host failures on a cloud platform according to claim 6, wherein in a case where it is judged that an evacuation count of the failed host removed from the failed host queue is less than an evacuation failure count threshold, the priority value of the cloud host in the failed host is restored to the initial priority value, and the failed host is rearranged in another failed host queue.

8. The method for handling large-scale host failures on a cloud platform according to claim 2, wherein in the case where the evacuation of the cloud host fails, re-determining the priority value of the cloud host according to the priority value change rule comprises:
  S401, comparing an evacuation failure count of the cloud host with the evacuation count threshold of the cloud host, executing S402 in a case where the evacuation failure count is less than the evacuation count threshold, and executing S403 in a case where the evacuation failure count is equal to the evacuation count threshold;
  S402, acquiring a reduction value, subtracting the reduction value from an attribute value of the priority value of the cloud host to determine an attribute value of a target priority value of the cloud host, and determining a level value of the target priority value of the cloud host according to a level value of the priority value of the cloud host plus one; and
  S403, restoring the priority value of the cloud host to the initial priority value, and setting the attribute value of the priority value to 0.

9. The method for handling large-scale host failures on a cloud platform according to claim 8, wherein a ratio of the number of cloud hosts that the host group corresponding to the failed host queue fails to evacuate to the evacuation count threshold is acquired, and the reduction value of the priority value of the cloud host is determined according to a mapping table between the ratio and the reduction value.

10. The method for handling large-scale host failures on a cloud platform according to claim 1, wherein enabling the failed host queue meeting the condition comprises:
  S701, enabling the failed host queue after the failed host in the host group corresponding to the disabled failed host queue is repaired; and
  S702, enabling the cloud host evacuated by the host in the host group corresponding to the disabled failed host queue to migrate, and enabling the failed host queue.

11. The method for handling large-scale host failures on a cloud platform according to claim 6, wherein the priority value of the cloud host that is removed from the failed host queue is restored to the initial priority value, and the initial priority of the failed host is re-determined according to the initial priority value.

12. The method for handling large-scale host failures on a cloud platform according to claim 1, wherein in a case where there are multiple hosts in a host group, a common port set is established based on ports, configured to evacuate cloud hosts, of the hosts in the same host group, and the port set is connected to the failed host queue corresponding to the host group; and in a case where a host is diagnosed as a failed host, the port of the host in the port set is disabled.

13. The method for handling large-scale host failures on a cloud platform according to claim 1, wherein in a case where there is only one host in a host group, the port, configured to evacuate the cloud host, of the host is connected to the failed host queue; and in a case where a host is diagnosed as a failed host, the port of the host in the port set is disabled.

14. The method for handling large-scale host failures on a cloud platform according to claim 3, wherein the attribute value of "second setting" is selected as "yes" by default, and the attribute value of "first setting" is selected as "first level" by default.

15. The method for handling large-scale host failures on a cloud platform according to claim 3, wherein the case that the attribute value of "second setting" is "no" is for the case that the cloud host on the cloud platform is not able to be evacuated when the host fails.

16. The method for handling large-scale host failures on a cloud platform according to claim 3, wherein configuration is performed according to a value degree of service that the cloud host needs to carry, and the priority value of the cloud host increases with the increase of the value degree of the service that the cloud host needs to carry.

17. The method for handling large-scale host failures on a cloud platform according to claim 16, wherein in a case where a service carried by the cloud host is changed during use, the attribute values of "second setting" and "first setting" are modified to reconfigure the initial priority value of the cloud host.

18. The method for handling large-scale host failures on a cloud platform according to claim 1, wherein when the number of evacuation attempts of a cloud host is equal to N, the initial priority value of the cloud host is set to 0.

19. An electronic device, comprising:
   a memory, adapted to store a computer program; and
   a processor, adapted to execute the computer program to implement the operations of the method according to claim 1.

20. A non-transitory computer-readable storage medium, wherein the computer-readable storage medium stores a computer program; and the computer program is used for implementing the operations of the method according to claim 1 when being executed by a processor.

* * * * *